United States Patent

Helmersson et al.

(10) Patent No.: US 8,477,899 B2
(45) Date of Patent: Jul. 2, 2013

(54) METHOD FOR OPERATING A REACTOR OF A NUCLEAR PLANT

(75) Inventors: Sture Lennart Helmersson, Kolback (SE); Nils Magnus Limback, Vasteras (SE); Jonathan Michael Wright, Vasteras (SE)

(73) Assignee: Westinghouse Electric Sweden AB, Vasteras (SE)

( * ) Notice: Subject to any disclaimer, the term of this patent is extended or adjusted under 35 U.S.C. 154(b) by 847 days.

(21) Appl. No.: 12/595,572

(22) PCT Filed: Apr. 7, 2008

(86) PCT No.: PCT/SE2008/050400
§ 371 (c)(1),
(2), (4) Date: Oct. 12, 2009

(87) PCT Pub. No.: WO2008/123832
PCT Pub. Date: Oct. 16, 2008

(65) Prior Publication Data
US 2010/0111242 A1   May 6, 2010

(30) Foreign Application Priority Data
Apr. 10, 2007   (SE) .................................... 0700868

(51) Int. Cl.
*G21C 17/022*   (2006.01)
*G21C 7/08*   (2006.01)
*G21C 7/32*   (2006.01)
*G21C 17/00*   (2006.01)
*G21C 7/00*   (2006.01)

(52) U.S. Cl.
USPC ........... 376/259; 376/207; 376/210; 376/219; 376/245; 376/277

(58) Field of Classification Search
USPC .................. 376/210, 214–219, 207, 241, 245, 376/250, 253, 236, 259, 260, 347, 361, 366, 376/370, 372, 277, 285; 976/DIG. 136, DIG. 138
See application file for complete search history.

(56) References Cited

U.S. PATENT DOCUMENTS 3,240,673 A   3/1966   Stubbs et al.
3,621,926 A * 11/1971   Townsend ..................... 376/372

(Continued)

FOREIGN PATENT DOCUMENTS

DE   2 157 037 A   5/1973
EP   0 143 542 A1   6/1985

(Continued)

*Primary Examiner* — Bernarr Gregory
(74) *Attorney, Agent, or Firm* — Alston & Bird LLP (57) ABSTRACT

A method of operating a nuclear reactor is disclosed. The reactor (1) encloses a core having a plurality of fuel rods (9). Each fuel rod (9) includes a cladding and fuel pellets of a nuclear fuel. The fuel pellets are arranged in an inner space of the cladding leaving a free volume comprising an upper plenum, a lower plenum and a pellet-cladding gap. The reactor is operated at a normal power and a normal inlet sub-cooling during a normal state. The reactor is monitored for detecting a defect on the cladding of any of the fuel rods. The operation of the reactor is changed to a particular state after detecting such a defect. The particular state permits an increase of the free volume in the defect fuel rod. The reactor is operated at the particular state during a limited time period, after which the reactor is operated at the normal state.

26 Claims, 2 Drawing Sheets

U.S. PATENT DOCUMENTS

| | | | |
|---|---|---|---|
| 3,778,347 A * | 12/1973 | Giras et al. | 376/217 |
| 3,817,829 A * | 6/1974 | Frisch et al. | 376/253 |
| 3,933,580 A * | 1/1976 | Aleite et al. | 376/217 |
| 4,036,691 A | 7/1977 | Meadowcraft et al. | |
| 4,057,466 A | 11/1977 | Thompson et al. | |
| 4,065,352 A | 12/1977 | Iwano et al. | |
| 4,071,335 A | 1/1978 | Barosi | |
| 4,104,117 A * | 8/1978 | Parziale et al. | 376/214 |
| 4,108,720 A * | 8/1978 | Sato et al. | 376/210 |
| 4,111,748 A | 9/1978 | Hayashi et al. | |
| 4,135,970 A * | 1/1979 | Mitsutsuka et al. | 376/253 |
| 4,170,516 A * | 10/1979 | Shinbo et al. | 376/207 |
| 4,337,118 A | 6/1982 | Sakurai et al. | |
| 4,486,381 A * | 12/1984 | Hirukawa Koji et al. | 376/210 |
| 4,548,784 A * | 10/1985 | Watari | 376/216 |
| 4,582,671 A * | 4/1986 | Rindo | 376/253 |
| 4,764,335 A * | 8/1988 | Gross et al. | 376/253 |
| 5,091,139 A * | 2/1992 | Chao et al. | 376/216 |
| 5,108,694 A * | 4/1992 | Stucker | 376/245 |
| 5,200,139 A * | 4/1993 | Mourlevat et al. | 376/216 |
| 5,537,450 A | 7/1996 | Asay et al. | |
| 5,544,208 A * | 8/1996 | Pao et al. | 376/253 |
| 5,930,317 A * | 7/1999 | Kono | 376/259 |
| 6,298,108 B1 | 10/2001 | Farawila | |
| 6,477,218 B1 * | 11/2002 | Fukasawa | 376/216 |
| 6,553,090 B2 * | 4/2003 | Fukasawa | 376/216 |
| 6,608,878 B1 * | 8/2003 | Schulze | 376/214 |

FOREIGN PATENT DOCUMENTS

| | | |
|---|---|---|
| EP | 1 265 256 A1 | 12/2002 |
| GB | 1 390 907 A | 4/1975 |
| GB | 2 259 805 A1 | 3/1993 |
| WO | WO 2005/122183 A1 | 12/2005 |

* cited by examiner

METHOD FOR OPERATING A REACTOR OF A NUCLEAR PLANT

BACKGROUND OF THE INVENTION AND PRIOR ART

The present invention refers to a method of operating a reactor of a nuclear plant in which the reactor comprises a reactor vessel enclosing a core having a plurality of fuel elements and a number of control rods, wherein each fuel element includes a plurality of elongated fuel rods, which each has an upper end and a lower end and includes a cladding and nuclear fuel in the form of fuel pellets enclosed in an inner space formed by the cladding, wherein the fuel pellets are arranged in the inner space to leave a free volume in the inner space, wherein the free volume comprises an upper plenum, containing no nuclear fuel and provided in the proximity of the upper end of the fuel rod, a lower plenum, containing no nuclear fuel and provided in the proximity of the lower end of the fuel rod, and a pellet-cladding gap between the fuel pellets and the cladding, wherein a reactor coolant, during operation of the reactor, is re-circulated as a coolant flow through the core in contact with the fuel rods and is added to the reactor via a feed-water conduit as feed-water having a normal feed-water temperature providing a sub-cooling of the reactor coolant, and wherein each of the control rods is displaceable a control rod distance to be inserted into and extracted from a respective position between respective fuel elements in the core, The reactor is a light water reactor and more precisely a boiling water reactor, BWR, or a pressurized water reactor, PWR. A method according to the prior art of this technical field is disclosed in WO 2005/122183.

In such a reactor, each fuel rod comprises a cladding and nuclear fuel in the form of a stack of fuel pellets of substantially uranium dioxide. The fuel pellets do not fill the whole inner space but there is also a free volume in the inner space in which the fuel pellets are permitted to swell, i.e. through thermal and irradiation expansion. According to prior art, the free volume includes or is formed by a gap between the fuel pellets and the inner side of the cladding, and by an upper plenum. The free volume, i.e. the inner space that is not filled by fuel pellets, is filled with helium to improve heat transfer in operation and to facilitate defect detection at manufacturing. Each of the control rods is insertable to and extractable from a respective position between (BWR) or in (PWR) respective fuel elements in the core in order to influence the power of the reactor, i.e. to control the power of the reactor and/or to shut down the operation of the reactor.

During unfortunate circumstances, it may happen that a smaller defect arises on the cladding of the fuel rod, a so-called primary defect. Such a primary defect can arise through wear from a foreign object. A small wear defect normally does not result in any significant dissolving and washing out of uranium dioxide from the fuel pellets of the fuel rod. A small primary defect may, however, result in a secondary degradation and the development of a larger secondary defect.

When a primary defect has been established, there is a communication passage for the reactor coolant to the inner space of the fuel rod. This means that water and steam may penetrate the inner space of the fuel rod until the internal pressure in the fuel rod is the same as the system pressure of the reactor. During this process, the inner side of the cladding and the fuel pellets will oxidize while releasing hydrogen from the water molecules in the reactor coolant. This release of hydrogen leads to an environment with a high partial pressure of hydrogen at a distance from the primary defect; a phenomenon, which is called "oxygen starvation" or "steam starvation". In such an environment, the inner side of the cladding is inclined to absorb hydrogen, so called hydriding, which is a basic material property of zirconium and zirconium-based alloys. This hydrogen absorption results in a locally very high hydrogen concentration in the cladding, which significantly deteriorates the mechanical properties of the cladding. The cladding then becomes brittle and this can due to self-induced stresses or due to external load, give rise to crack initiation, crack growth and the development of a secondary fuel defect.

During normal operation of the reactor at principally full power, a primary defect can, as appears from above, arise in a fuel rod. It can be assumed that the defect fuel rod has an average load of for instance 20 kW/m, a certain pellet-cladding-gap, for instance 5-20 μm, and an internal pressure of for instance 5-100 bars. The internal pressure in fuel rods of a BWR lies during operation in the lower region of the interval, whereas the internal pressure in fuel rods of a PWR during operation can lie in the upper region of the interval. When the primary defect arises, the pressure difference between the internal pressure of the fuel rod and the system pressure will disappear, i.e. the internal pressure of the fuel rod will be the same as the system pressure. The system pressure in a BWR is typically about 70 bars, whereas the system pressure in a PWR typically is about 150 bars. When a primary defect occurs, the fill gas, which normally consists substantially of helium and fission gases from the fuel pellets, will be transported towards both the ends of the fuel rod. Steam will be introduced until the internal pressure of the fuel rod equals the system pressure.

Before the fuel rod is taken into operation and the radiation is initiated, the fill gas of the fuel rod normally consists substantially of helium and the internal pressure of the fuel rod is at room temperature typically 1-40 bars. The internal pressure in fuel rods for a BWR typically lies in the lower region of the interval, whereas the internal pressure in fuel rods for a PWR normally lies in the upper region of the interval. During operation some fission gas is released from the pellets and mixed with the fill gas. The total pressure is then increased and may at end-of-life exceed the system pressure for some fuel rods. In case of a primary defect, the pressure equalizes also in these cases. It is of importance that the released fission gas also includes inert gases, e.g. He, Xe and Kr.

As mentioned above, the steam will, after the occurrence of a primary defect and the introduction of water, react with the cladding and the fuel pellets during release of hydrogen from the water molecules, which react with the cladding or the fuel pellets. This means that an area with a very high partial pressure of hydrogen can be obtained at a distance from the primary defect. It is thus likely that very soon after the occurrence of the primary defect an area with fill gas has been formed at each of the two ends of the fuel rod. The free volumes, which are present directly adjacent to the ends, may initially contain substantially pure hydrogen gas, mixed with inert gases but free from steam. Since the partial pressure of hydrogen is very high in these areas directly after the occurrence of the primary defect, the risk for secondary degradation is high. However, if the partial pressure of hydrogen decreases and the partial pressure of steam increases, the local massive hydrogen absorption, and thus the risk for local secondary degradation will be reduced. The hydrogen absorption can take place more homogeneously over the whole inner side of the cladding wall.

Steam has inferior heat transfer properties as compared to He. Consequently, the fuel pellets normally increases in temperature subsequent to the occurrence of a primary failure and the associated steam ingress. The thermal expansion that is connected to the increase of the temperature of the fuel pellets further reduces the pellet-cladding gap and reduces the gas communication within the rod. Oxidation of the cladding and the fuel pellets will have a similar restrictive effect by the formation of oxides with lower density and larger volume.

WO 2005/122183 discloses a method according to which the risk for a secondary degradation can be reduced. More specifically, WO 2005/122/183 discloses a method for operating a reactor of a nuclear plant in which the reactor encloses a core having a plurality of fuel elements and a number of control rods. Each fuel element includes a plurality of fuel rods, which each includes a cladding and nuclear fuel in the form of fuel pellets enclosed in an inner space formed by the cladding. Each of the control rods is insertable to and extractable from a respective position between respective fuel elements in the core in order to influence the power of the reactor. The method includes the following steps: operating the reactor at a normal power during a normal state; monitoring the reactor for detecting a defect on the cladding of any of the fuel rods; reducing the power of the reactor after detecting such a defect; operating the reactor during a particular state during a limited time period during which the reactor at least periodically is operated at the reduced power in relation to the normal power; and extracting said inserted control rods after said time period for continuing operation of the reactor at substantially the normal state.

Since the reactor according to WO 2005/122183, when a primary defect has been detected, is operated at a reduced power, the nuclear reaction in the fuel will decrease. The temperature in the fuel pellets will thus decrease, which reduces the thermal expansion of the fuel pellets. Consequently, the free volume and the communication paths in the inner space of the fuel rod increases. This means that even more steam may penetrate the inner space of the fuel rod for maintaining the pressure equalization between the inner space of the fuel rod and the system pressure. In addition, the reaction rates for the oxidation of the cladding and the fuel pellets, and for the hydriding of the cladding, will decrease when the reactor power is reduced and the fuel temperature decreases. Since the defect fuel rod, when the power is reduced, has a substantially lower fuel pellet temperature and a substantially larger free volume in the inner space, the gases, i.e. the fill gas, formed fission gases, hydrogen gas and steam, will be mixed through diffusion. Diffusion will take place also at higher pellet temperatures, but the oxidation and hydriding rates may then be so high that the diffusion will have no significant importance in comparison to the gas movements arising due to the pressure difference between the different parts of the fuel rod. Consequently, according to WO 2005/122183, the gas mixing via diffusion will be the dominating mechanism for significantly decreasing and distributing the consumption of oxygen and hydrogen in the fuel rod. During these conditions, a gas mixing is thus obtained in the inner space at the same time as the hydriding is relatively slow. When a proper mixture of hydrogen and water molecules has been obtained in the inner space of the fuel rod, the hydrogen absorption at a continuing operation will take place more homogeneously along the whole fuel rod. It is thus possible to avoid the creation of a zone of the cladding, which has significantly degraded mechanical properties as a consequence of a powerful local hydriding. The homogeneous hydrogen distribution makes the fuel rod significantly less sensitive to crack initiation, crack growth and the development of a secondary defect. Consequently, the limited time period, during which the reactor is operated, at least periodically, at a reduced power, leads to a significant increase of the probability that the reactor with the same set of fuel rods thereafter can be operated until the next scheduled normal revision outage without any additional shut downs for removing defect fuel and without requiring the introduction of control rods for locally reducing the power in the region of the core where the defect fuel rod is located.

U.S. Pat. No. 5,537,450 discloses a device for detecting whether there is a fuel defect. The device is arranged to detect fuel defects during operation of the reactor by conveying a part of the off-gases from the reactor via a gamma spectrograph that continuously measures the nuclide composition and the activity level in the off-gases. It is also known to localize a fuel defect by a method called "flux-tilting", which means that the control rods are operated one by one so that the power is changed locally in the core at the same time as the activity level in the off-gases is measured. An increase of the activity level in the off-gases can be correlated to control rod movements in the proximity of the fuel defect. In such a way the fuel defect can be localized. This method is time-consuming and during the time when the localization takes place, the power of the reactor is reduced to between 60 and 80% of full power.

U.S. Pat. No. 6,298,108 discloses a fuel rod for a BWR. The fuel rod has an upper end and a lower end and includes a cladding and nuclear fuel in the form of fuel pellets enclosed in an inner space formed by the cladding. The fuel pellets are arranged in the inner space in such a way that an upper plenum, containing no nuclear fuel, is provided in the proximity of the upper end of the fuel rod, and a lower plenum, containing no nuclear fuel, is provided in the proximity of the lower end of the fuel rod. The axial length of the lower plenum is approximately 50% of the axial length of the upper plenum.

SUMMARY OF THE INVENTION

The object of the present invention is to counteract degradation of a possible primary defect and thus reduce the risk of a secondary defect during a continuing operation of the reactor.

This object is achieved by the method initially defined, which includes the following steps of operation:
  operating the reactor at a normal power and a normal sub-cooling during a normal state,
  monitoring the reactor for detecting a defect on the cladding of any of the fuel rods,
  changing the operation of the reactor to a particular state after detecting such a defect, wherein the particular state is configured to permit an increase of the free volume at least in the fuel rod in which a defect is detected,
  operating the reactor at the particular state during a limited time period, and
  operating, after said time period, the reactor at substantially the normal state.

When a primary defect has been detected, the reactor is thus operated at the particular state increasing of the free volume and thus gas communication paths in the inner space of the fuel rod. During the particular state, the nuclear reaction in the fuel, and thus the temperature and the thermal expansion of the fuel pellets will decrease. The increased free volume, permits more steam to penetrate the inner space of the fuel rod, which will reduce the reaction rates for the oxidation of the cladding and the fuel pellets, and for the hydriding of the cladding. The gases, i.e. the fill gas, formed fission gases, hydrogen gas and steam, will be mixed through diffusion. The lower plenum enhances the gas mixing in the lower end of the fuel rod, while the upper plenum has the same effect in the upper end of the fuel rod.

The steam in the mixture of gases in the lower plenum will, during the particular state, condense thanks to the reduction of the partial pressure of steam from approximately 70 bar to approximately 44 bar at a reduction of the temperature of the mixture of gases of approximately 30K. As a consequence thereof, even more steam may penetrate the inner space of the fuel rod than is possible with the method proposed in WO 2005/122183.

According to a development of the method, the lower plenum has a longitudinal length along the elongated fuel rod and the upper plenum has a longitudinal length along the elongated fuel rod, wherein the longitudinal length of the lower plenum is significantly shorter than the longitudinal length of the upper plenum. In particularly, the longitudinal length of the lower plenum may be less than 30% of the total longitudinal length of the upper plenum and the lower plenum.

According to a development of the method, the particular state comprises at least one of the following steps of operation: operating the reactor at a reduced power in relation to the normal power during the normal state, and operating the reactor at an increased sub-cooling of the reactor coolant in relation to the normal sub-cooling during the normal state in order to achieve a larger temperature gradient over the fuel rod. Along with the power reduction, at the particular state, the lower plenum will be cooled. The normal state of a BWR includes a system pressure of 70 bar and a reactor coolant temperature of approximately 286° C., i.e. saturation conditions. The core inlet temperature is normally about 10° C. below the saturation temperature, known as the sub-cooling. One way to reduce power is to reduce the core coolant flow in a BWR, which will increase the sub-cooling. The sub-cooling can be further enhanced by shutting off one or more of the preheaters in the feed-water preheating arrangement.

According to a further development of the method, said reduced power and/or increased sub-cooling is obtained by reducing the coolant flow of the reactor coolant through the core. Such a power reduction can be performed very quickly and lead to a quick decrease of the temperature of the fuel pellets, which decreases their volume and thus increases the free volume and the gas communication paths in the inner space of the defect fuel rod.

According to a further development of the method, the added reactor coolant is preheated outside the reactor during the normal state by means of a preheating arrangement, wherein said increased sub-cooling of the reactor coolant is obtained by reducing the preheating of the added reactor coolant, i.e. of the feed-water. Such an increased sub-cooling can be performed very quickly and efficiently. The normal feed-water temperature in the normal state of operation is approximately in the range from 180° to 240° C. By increasing the sub-cooling this feed-water temperature will be decreased by disconnecting one or several preheaters of the preheating arrangement.

According to a further development of the method, said reduced power is obtained by displacing at least some of the control rods into the core at least a part of the control rod distance. Also such a power reduction can be performed very quickly and efficiently.

According to a further development of the method, substantially all control rods are at least periodically displaced at least a part of the control rod distance during the particular state. In this case, a particularly significant power reduction is obtained for the important lower part of the fuel rods. This is particularly efficient in combination with the above mentioned increased sub-cooling.

According to a further development of the method, said reduced power is obtained by displacing successively different groups of the control rods at least a part of the control rod distance, wherein each such group defines a respective specific part of the core. The particular state may thus also be established for different parts of the core in successive periods. Individual control rods or groups of control rods may then be used for the power reduction. This permits identification of the position of the defect fuel rod and limits the necessary power reduction.

According to a further development of the method, the reactor is operated at the reduced power during the whole time period of the particular state. Advantageously, substantially all control rods may be displaced at least a part of the control rod distance during the whole time period of the particular state.

According to a further embodiment of the method, the particular state is initiated at least within 72 h after the detection of a defect, preferably within 48 h after the detection of a defect, and more preferably within 24 h after the detection of a defect. Advantageously, the particular state is initiated substantially immediately after the detection of a defect. It is advantageous if the power reduction takes place quickly so that the desired mixture in the inner space is obtained as soon as possible after the occurrence of a defect.

According to a further development of the method, the particular state involves that at least some of the control rods are alternately inserted into and extracted from the respective position for obtaining an alternating increase and decrease of the power. This may be advantageous when the position of the defect fuel rod has been identified.

According to a further development of the method, said monitoring includes continuous monitoring during the operation of the reactor. The monitoring may then advantageously include sensing of a radioactive activity, or the presence of one or several fission gases, in a gas flow from the reactor.

According to a further development of the method, the fuel rod comprises a hydrogen absorbing element provided in the upper plenum and/or a hydrogen absorbing element provided in the lower plenum. By means of such a hydrogen absorbing element, the risk for hydriding can be further reduced, since hydrogen present in the fill gas at least to a certain extent may be absorbed by the hydrogen absorbing element, and thus the percentage of hydrogen in the inner space of the cladding can decrease.

According to a further development of the method, the hydrogen absorbing element comprises a hydrogen absorbing body having a surface coated with a layer of a substance that is non-oxidizing and permeable to hydrogen. Such a hydrogen absorbing element in at least one of the plenums will absorb hydrogen if the element is in an environment with a high partial pressure of hydrogen, i.e. in a zone where there is a high risk for hydriding, whereas the element, due to the non-oxidizing coating, will not react with water or steam in the environment.

According to a further development of the method, the absorbing body is enclosed in an imaginary body having a substantially convex outer surface, and wherein the surface of the absorbing body is significantly greater than the outer surface of the imaginary body. With such a surface enlarging of the hydrogen element, the absorption ability is further increased.

According to a further development of the method, the coating substance comprises at least one metal in the group consisting of palladium, rhodium, rhenium and alloys comprising one or more of these metals.

According to a further development of the method, the absorbing body comprises at least one metal in the group consisting of zirconium, titanium, nickel and alloys comprising one or more of these metals.

According to a further development of the method, the fuel rod comprises a distance element provided in the upper plenum and/or a distance element provided in the lower plenum.

According to a further development of the method, at least one of the distance elements forms the absorbing element.

According to a further development of the method, at least one of the distance elements is deformable for permitting swelling of the fuel pellets.

BRIEF DESCRIPTION OF THE DRAWINGS

The present invention is now to be explained more closely by means of an embodiment that is disclosed as an example and with reference to the drawings attached hereto, in which FIG. 1 discloses schematically a BWR nuclear plant and FIG. 2 discloses schematically a longitudinal section through a fuel rod.

DETAILED DESCRIPTION OF VARIOUS EMBODIMENTS

Figure 1:
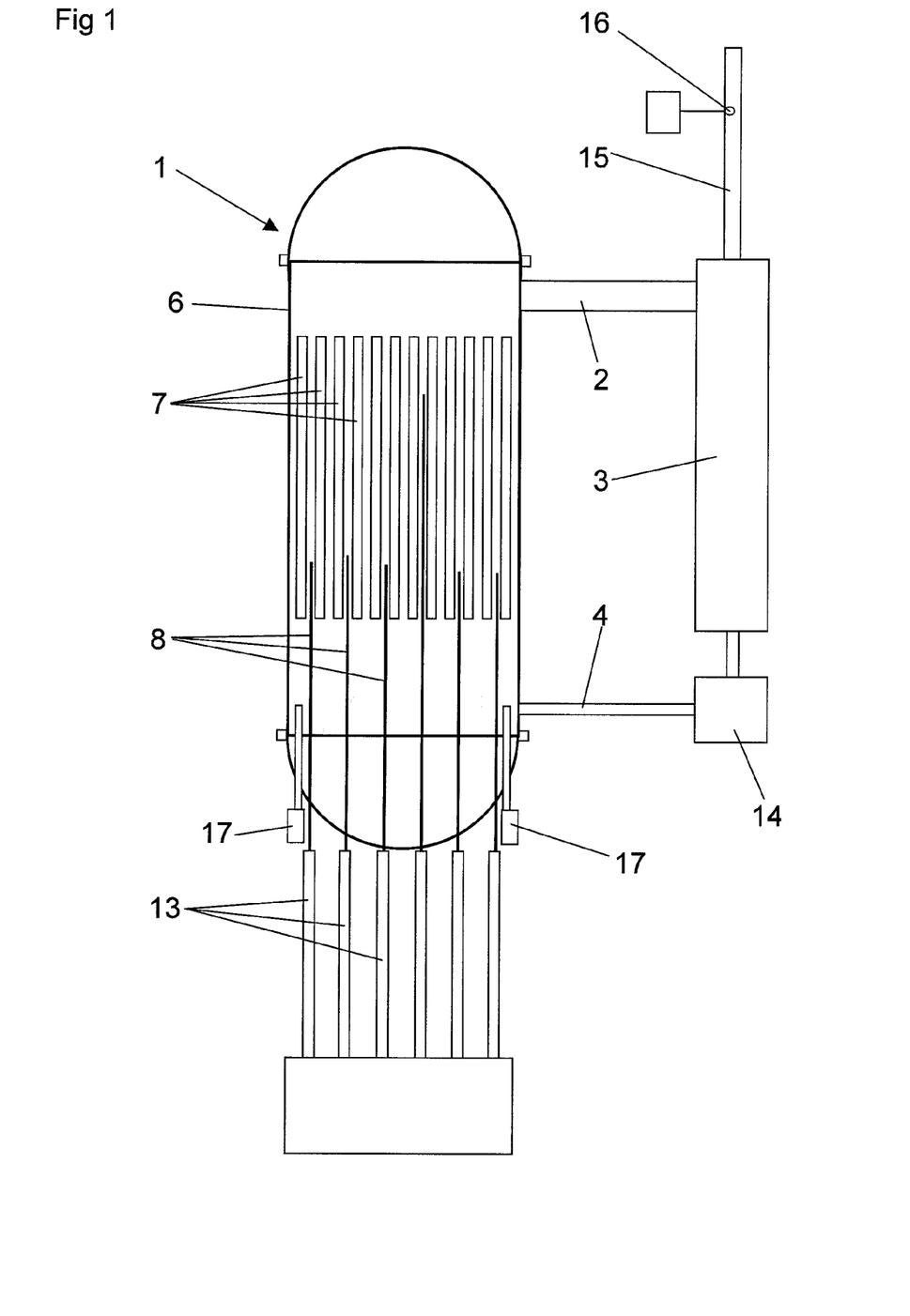

FIG. 1 discloses a nuclear plant including a reactor 1, a discharge conduit 2 from the reactor 1, a utility device 3 and a feed-water conduit 4 from the utility device 3 back to the reactor 1. The reactor 1 may be a boiling water reactor, BWR, or a pressurized water reactor, PWR. In the example disclosed, it is referred to a BWR although the invention is applicable also to a PWR.

The reactor 1 comprises a reactor vessel 6, which encloses a core with a plurality of fuel elements 7 and a number of control rods 8. Each fuel element 7 includes a plurality of elongated fuel rods 9, see FIG. 2, which each extends along a longitudinal axis between an upper end 9' and a lower end 9". Each fuel rod 9 includes a cladding 10 and nuclear fuel in the form of a pile of fuel pellets 11, which are enclosed in an inner space 12 formed by the cladding 10. Since the fuel pellets 11 do not take up the whole inner space 12, a free volume with no nuclear fuel is formed in the inner space 12 of the cladding 10. The size of the free volume varies with the temperature of the fuel pellets 11, and thus with the thermal expansion of the fuel pellets 11.

Figure 2:
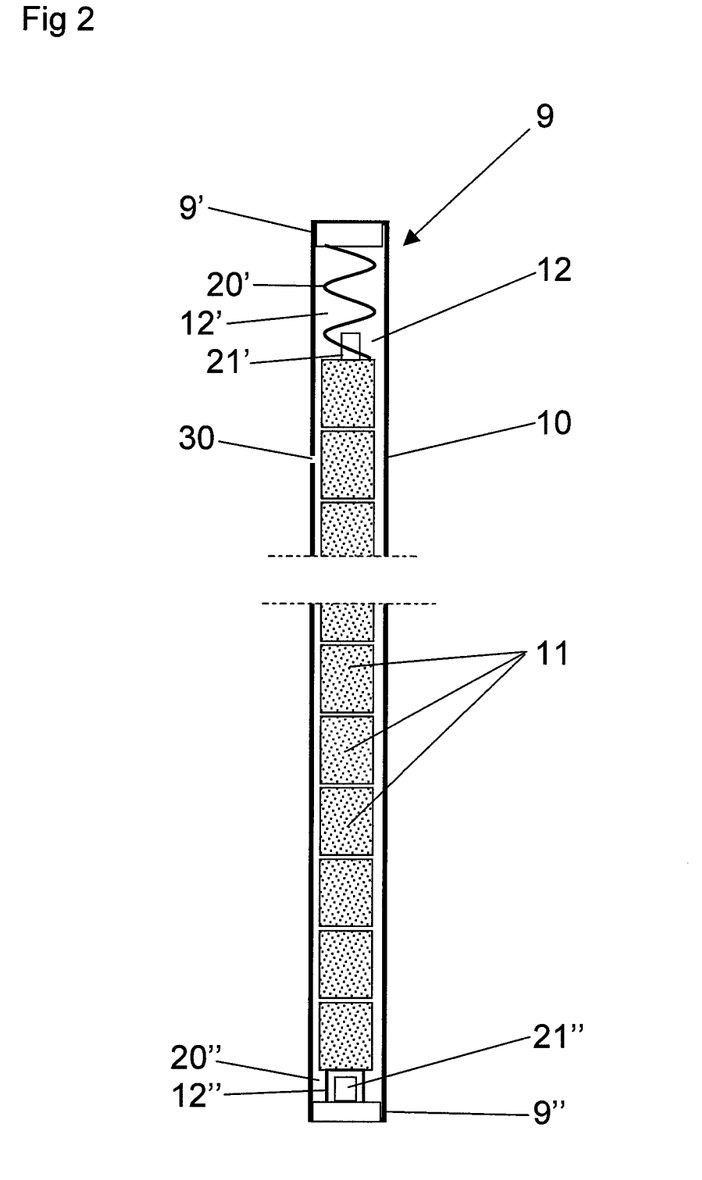

The free volume is formed by a pellet-cladding gap, of for instance 5-20 μm, between the fuel pellets 11 and the inner side of the cladding 10, an upper plenum 12' and a lower plenum 12". The upper plenum 12', containing no nuclear fuel, is provided in the proximity of the upper end 9' of the fuel rod 9. The lower plenum 12, containing no nuclear fuel, is provided in the proximity of the lower end 9" of the fuel rod 9. The total longitudinal length of the elongated fuel rod 9 is approximately 4 meters. The total longitudinal length of the plenums 12', 12" is approximately 25-40 cm. The lower plenum 12" has a longitudinal length, which is significantly shorter than the longitudinal length of the upper plenum 12'. For instance, the longitudinal length of the lower plenum 12' is less than 30%, preferably less than 20% and more preferably less than 10% of the total longitudinal length of the plenums 12' and 12".

It is to be noted that each or some of the fuel rods 9 may also comprises one or more intermediate plenums (not disclosed), containing no nuclear fuel. Such one or more intermediate plenums are provided between the upper plenum 12' and the lower plenum 12". The one or more intermediate plenums are separated from each other and from the upper plenum 12' and the lower plenum 12" by some of the fuel pellets. The total longitudinal length of the plenums 12', 12" and the one or more intermediate plenums is still approximately 25-40 cm.

Each of the control rods 8 is displaceable a control rod distance to be inserted to and extractable from a respective end position between respective fuel elements 7 in the core by means of drive members 13. The control rods 8 can be used, in a BWR, for influencing or controlling the power of the reactor 1. When the control rods 8 are extracted the nuclear chain reaction proceeds and when the control rods 8 are inserted to the respective end position in the core, the nuclear chain reaction stops at least in the proximity of the inserted control rods 8. During normal operation of the reactor, most of the control rods 8 are extracted, compare FIG. 1. In a BWR, the control rods 8 are displaceable to positions along the control rod distance between the end position and the extracted position in order to permit control of the power of the reactor. In a PWR, the control rods are displaceable to the fully inserted end position or to the fully extracted position, thereby influencing the power of the reactor.

In a BWR, the reactor coolant is re-circulated in a primary system. The reactor coolant of the primary system is converted to steam in the reactor 1. The steam is separated from water and conveyed to the utility device 3 including a steam turbine and a condenser. From the condenser, in which the steam is converted to water, the reactor coolant is fed back to the reactor 1, as feed-water, via a preheating arrangement 14 and the feed-water conduit 4. The feed-water may be preheated in the preheating arrangement 14 to a normal feed-water temperature of approximately 180-240° C. before being conveyed back to the reactor 1 via the feed-water conduit 4. The preheating arrangement 14 may comprises one or more heat exchangers.

The plant also includes an arrangement for catching and removing off-gases produced in the reactor 1. This arrangement may include an off-gas conduit 15. In, for instance, the off-gas conduit 15, a sensor 16 may be provided. The sensor 16 is arranged to detect radioactive nuclides formed at the reaction in the fuel rods 9. If a defect arises on a cladding 10, fission gases will leak out and be conveyed out from the primary system through the off-gas conduit 15. These fission gases include such radioactive nuclides that can be detected and give substantially immediate information indicating that a primary defect has occurred.

During operation, the reactor coolant is also re-circulated as a coolant flow within the reactor 1 through the core in contact with the fuel rods 9, thereby influencing the power of the reactor 1. This re-circulation of reactor coolant is accomplished by means of a number a circulation pumps 17, normally provided in the proximity of the bottom of the reactor 1. In FIG. 1, merely two such circulation pumps 17 are schematically indicated. Also other arrangements of circulation pumps then those indicated herein may be used, e.g. in external loops or jet pumps internally in the reactor, which are driven by external feed pumps.

Each fuel rod 9 also comprises a distance element 20' provided in the upper plenum 12' and a distance element 20" provided in the lower plenum 20". In the embodiment disclosed, the distance element 20' in the upper plenum 12' is configured as a plenum spring. The purpose of the distance element 20' in the upper plenum 12' is to maintain the fuel pellets 11 in a proper position in the inner space 12 of the cladding 10. Furthermore, the distance element 20' of the upper plenum 12' is configured to permit deformation or compression of the plenum spring in order to absorb swelling of the fuel pellets 11 during the operation of the reactor 1. The purpose of the distance element 20" in the lower plenum 12" is to maintain the fuel pellets 11 in a proper position in the inner space 12 of the cladding 10, and more precisely to carry the weight of the pile of fuel pellets 11. In the embodiment disclosed, the distance element 20" in the lower plenum 12" is configured as a rigid body, and more precisely as a short tube, see U.S. Pat. No. 6,298,108. The distance member 20" of the lower plenum 12" may be configured in a different manner as a rigid body of any suitable shape. Possibly, also the distance element 20" of the lower plenum 12" may be configured to permit deformation or compression of the plenum spring in order to absorb a part of the swelling of the fuel pellets 11 during the operation of the reactor 1. In case the fuel rod 9 comprises an intermediate plenum, a distance element is provided also in such an intermediate plenum.

Furthermore, each or some of the fuel rods 9 may comprise a hydrogen absorbing element 21' provided in the upper plenum 12' and/or a hydrogen absorbing element 21" provided in the lower plenum 12". The hydrogen absorbing element 21', 21" comprises a hydrogen absorbing body comprising or consisting of at least on metal in the group consisting of zirconium, titanium, nickel and alloys comprising one or more of these metals. These metals have a great ability to absorb hydrogen. The absorbing body has a surface coated with a layer of a substance that is permeable to hydrogen, but not permeable to substances consisting of molecules larger than hydrogen molecules. This substance of the layer comprises at least one metal in the group consisting of palladium, rhodium, rhenium and alloys comprising one or more of these metals.

In the embodiment disclosed the absorbing body has a cylindrical shape. It is to be noted, that the absorbing body may have any suitable shape, for instance a spherical or a cubic shape, or a more complex shape with an outer contour with a relatively large surface area, which is advantageous. In order to achieve such a large surface area, the absorbing body may be enclosed in an imaginary body having a substantially convex outer surface, and wherein the surface of the absorbing body is significantly greater than the outer surface of the imaginary body.

In a further embodiment, at least one of the distance elements 20', 20" forms the absorbing element. Especially the distance element 20" of the lower plenum 12" may be formed as a hydrogen absorbing element. In case the fuel rod 9 has an intermediate plenum, a hydrogen absorbing element may be provided in this intermediate plenum.

According to an embodiment, the reactor 1 may be operated at a normal power, i.e. normally full power, during a normal state. During this normal operation, the reactor 1 is monitored frequently or continuously by means of the sensor 16 for detecting a possible defect on the cladding 10 of any of the fuel rods 9 in the core. The possible defect may be a primary defect, which for instance has been caused by mechanical wear. The defect is indicated in FIG. 2 at 30.

If such a defect 30 has been detected, the operation of the reactor is changed to a particular state, comprising a reduced power of the reactor 1 and/or an increased sub-cooling of the reactor coolant. The change of the operation is made at least within 72 h, preferably within 48 h or more preferably within 24 h after the detection of the defect 30. Advantageously, the change of the operation to the particular state is made as soon as possible, for instance substantially immediately after the detection of the defect 30.

The particular state may thus be obtained through one or a combination of the following measures.

1. The power may be reduced, in a BWR, by reducing the coolant flow of the reactor coolant through the core. Such a coolant flow reduction may be obtained by reducing the power or the speed of the one or more of the circulation pumps 17.

2. The power may be reduced, in a BWR or a PWR, by inserting at least some of the control rods to the respective position in the core.

3. The sub-cooling of the reactor coolant may be increased, in a BWR or a PWR, by reducing the preheating of the feed-water, for instance by shutting off one or more of the heat exchangers of the preheating arrangement 14.

Especially in a BWR, the power may be reduced by displacing at least some of the control rods into the core at least a part of the control rod distance. For instance, the control rods 8 can be displaced a smaller distance, so that they covers at least approximately 15 cm, at least approximately 30 cm, or at least approximately 50 cm, of the fuel rod 9 from the bottom of the fuel rod 9.

Upon the displacement of the control rods 8 into the core, by means of the drive members 13, the chain reaction is reduced and thus the power and temperature of the fuel pellets 11 in the fuel rods 9 decrease. If the control rods 8 are fully inserted to the respective end positions, a so called hot shut down is obtained, which means that the chain reaction substantially ceases but that the system pressure in the reactor 1 and the temperature of the coolant water in the reactor 1 are substantially maintained from residual heat generation from the fission products.

The reactor 1 is then operated further at a reduced power and/or increased sub-cooling according to one or more of the measures 1-3 mentioned above, for instance with the control rods 8 inserted, during a particular state, which exists during a limited time period. The length of this limited time period may vary depending on a plurality of different factors, such as the size of the reactor 1, how many control rods 8 that has been inserted etc. During this time period, the power is thus substantially reduced in relation to the normal full power and a larger temperature gradient is established over the length of the fuel rod. The time period has to have at least such a length that the temperature of the fuel pellets decreases significantly. The limited time period may for instance rest from parts of an hour or some hours to 1, 2, 3 or 4 days. For instance, the limited time period may be at least 10, 20, 30, 40 or 50 minutes, or 1, 2, 3, 4, 5, 6, 7, 10, 14, 20 or more hours. The limited time period may maximally be 4, 3, 2 or 1 days.

During the particular state, the thermal expansion of the fuel pellets 11 will decrease, and thus the free volume and the gas communication paths in the inner space 12 of the defect fuel rod 9 will increase. This volume increase means that further steam will penetrate the inner space 12 so that the pressure equalization between the inner space 12 and the system pressure is maintained. Furthermore, the lower temperature of the fuel pellets 11 means that the reaction rate for the oxidation of the cladding 10 and the fuel pellets 11 as well as for the hydriding of the cladding 10 decreases.

Substantially immediately after this time period, when the equalization has taken place, the reactor 1 may again be operated at substantially full power with the same set of fuel rods 9. Consequently, the defect fuel rod 9 may be retained in the core until the next scheduled shut down for fuel exchange.

It is to be noted that it may be possible during the defined time period to insert merely some of the control rods 8 to the respective position. The particular state may also be established for parts of the core in successive periods, wherein said reduction of the power is obtained through successive insertion of various groups of said control rods to respective position in the core. Each such group then advantageously defines a specific part of the core. It is also possible to imagine insertion of more than half of the control rods 8 for obtaining a power reduction influencing a greater fraction of the fuel elements of the reactor.

According to a variant of the method the particular state includes that at least some or substantially all control rods 8 alternately are inserted to or extracted from the respective position for obtaining an alternating increase and decrease of the power. Analogously the sub-cooling can be alternated by changing the preheating of the feed-water. In such a way, the temperature and the thermal expansion of the fuel pellets 11 will also increase and decrease in an alternating manner, which means that the mixing of the gases in the inner space is accelerated.

The invention is not limited to the embodiments disclosed but may be varied and modified within the scope of the following claims.

The invention claimed is:

1. A method of operating a reactor (1) of a nuclear plant in which the reactor (1) comprises a reactor vessel (6) enclosing a core having a plurality of fuel elements (7) and a number of control rods (8),
   wherein each fuel element (7) includes a plurality of elongated fuel rods (9), which each has an upper end (9') and a lower end (9") and includes a cladding (10) and nuclear fuel in the form of fuel pellets (11) enclosed in an inner space (12) formed by the cladding,
   wherein the fuel pellets (11) are arranged in the inner space to leave a free volume in the inner space, wherein the free volume comprises an upper plenum (12'), containing no nuclear fuel and provided in the proximity of the upper end of the fuel rod, a lower plenum (12"), containing no nuclear fuel and provided in the proximity of the lower end of the fuel rod, and a pellet-cladding gap between the fuel pellets (11) and the cladding (10),
   wherein a reactor coolant, during operation of the reactor, is re-circulated as a coolant flow through the core in contact with the fuel rods (9) and is added to the reactor via a feed-water conduit (4) as feed-water having a normal feed-water temperature providing a sub-cooling of the reactor coolant, and
   wherein each of the control rods (8) is displaceable a control rod distance to be inserted into and extracted from a respective position between respective fuel elements in the core, the method including the following steps of operation:
   operating the reactor at a normal power and a normal sub-cooling during a normal state,
   monitoring the reactor for detecting a defect on the cladding of any of the fuel rods,
   upon detecting a defective fuel rod having said defect on the cladding thereof, changing the operation of the reactor to a particular state that causes an increase of the free volume at least in the defective fuel rod in which the defect is detected,
   operating the reactor at the particular state during a limited time period, and
   operating, after said time period, the reactor at substantially the normal state.

2. A method according to claim 1, comprising providing the lower plenum (12") to have a longitudinal length along the elongated fuel rod (9) and the upper plenum (12') to have a longitudinal length along the elongated fuel rod (9), wherein the longitudinal length of the lower plenum (12") is provided to be shorter than the longitudinal length of the upper plenum (12').

3. A method according to claim 2, wherein the longitudinal length of the lower plenum is provided to be less than 30% of the total longitudinal length of the upper plenum (12') and the lower plenum (12").

4. A method according to claim 1, wherein changing the operation of the reactor to the particular state comprises at least one of the following steps of operation:
   operating the reactor at a reduced power in relation to the normal power during the normal state, and
   operating the reactor at an increased sub-cooling of the reactor coolant in relation to the normal sub-cooling during the normal state in order to achieve a larger temperature gradient over the fuel rod.

5. A method according to claim 4, wherein changing the operation of the reactor to the particular state comprises reducing the coolant flow of the reactor coolant through the core.

6. A method according to claim 4, wherein the added reactor coolant is preheated outside the reactor during the normal state by means of a preheating arrangement (14), and wherein said increased sub-cooling of the reactor coolant is obtained by reducing the preheating of the added reactor coolant.

7. A method according to claim 4, wherein said reduced power is obtained by displacing at least some of the control rods (8) into the core at least a part of the control rod distance.

8. A method according to claim 7, wherein substantially all control rods (8) are at least periodically displaced at least a part of the control rod distance during the particular state.

9. A method according to claim 4, wherein said reduced power is obtained by displacing successively different groups of the control rods (8) at least a part of the control rod distance, wherein each such group defines a respective specific part of the core.

10. A method according to claim 4, wherein the reactor is operated at the reduced power during the whole time period of the particular state.

11. A method according to claim 4, wherein substantially all control rods are displaced at least a part of the control rod distance during the whole time period of the particular state.

12. A method according to claim 1, wherein the particular state is initiated at least within 72 hours after the detection of a defect.

13. A method according to claim 1, wherein the particular state is initiated at least within 48 hours after the detection of a defect.

14. A method according to claim 1, wherein the particular state is initiated at least within 24 hours after the detection of a defect.

15. A method according to claim 1, wherein the particular state is initiated immediately after the detection of a defect.

16. A method according to claim 1, wherein the particular state involves that at least some of the control rods are alternately displaced in the core for obtaining an alternating increase and decrease of the power.

17. A method according to claim 1, wherein said monitoring includes continuous monitoring during the operation of the reactor.

18. A method according to claim 1, wherein the monitoring includes sensing of a radioactive activity in a gas flow from the reactor.

19. A method according to claim 1, wherein the fuel rod is provided to comprise a hydrogen absorbing element (21') in at least one of the upper plenum (12') and the lower plenum (12").

20. A method according to claim 19, wherein the hydrogen absorbing element (21', 21") is provided to comprise a hydrogen absorbing body having a surface coated with a layer of a substance that is non-oxidizing and permeable to hydrogen.

21. A method according to claim 20, wherein the absorbing body is enclosed in an imaginary body having a substantially convex outer surface, and wherein a surface area of the absorbing body is greater than a surface area of the outer surface of the imaginary body.

22. A method according to claim 20, wherein the substance is provided to comprise at least one metal in the group consisting of palladium, rhodium, rhenium and alloys comprising one or more of these metals.

23. A method according to claim 20, wherein the absorbing body is provided to comprise at least one metal in the group consisting of zirconium, titanium, nickel and alloys comprising one or more of these metals.

24. A method according to claim 1, wherein the fuel rod (9) is provided to comprise a distance element (20') provided in the upper plenum (12') and/or a distance element (20") provided in the lower plenum (12").

25. A method according to claim 24, wherein at least one of the distance elements (20', 20") is provided to form the absorbing element.

26. A method according to claim 24, wherein at least one of the distance elements is provided to be deformable for permitting swelling of the fuel pellets.

* * * * *